United States Patent [19]
FitzPatrick

[11] Patent Number: 5,880,368
[45] Date of Patent: Mar. 9, 1999

[54] INERTIAL SENSORS

[75] Inventor: Roger Sean FitzPatrick, Cheltenham, England

[73] Assignee: Smiths Industries Public Limited Company, London, England

[21] Appl. No.: 859,264

[22] Filed: May 20, 1997

Related U.S. Application Data

[63] Continuation-in-part of Ser. No. 610,147, Feb. 29, 1996, abandoned.

[30] Foreign Application Priority Data

Apr. 19, 1995 [GB] United Kingdom .................. 9507930

[51] Int. Cl.⁶ ........................................................ G01P 1/00
[52] U.S. Cl. ................................................. 73/493; 73/510
[58] Field of Search ............................ 73/493, 494, 495, 73/383, 504.03, 504.04, 862.043, 431, 510, 511, 512, 382 G, 382 R, 178 R, 504.12, 335.02

[56] References Cited

U.S. PATENT DOCUMENTS

| | | | |
|---|---|---|---|
| 4,179,818 | 12/1979 | Craig | 73/178 R |
| 4,212,443 | 7/1980 | Duncan | 73/504.03 |
| 4,703,394 | 10/1987 | Petit | 361/413 |
| 4,744,248 | 5/1988 | Stewart | 73/504.04 |
| 4,891,984 | 1/1990 | Fujii et al. | |
| 5,012,316 | 4/1991 | Silvermint | |
| 5,038,613 | 8/1991 | Takenaka | 73/493 |
| 5,101,669 | 4/1992 | Holm-Kennedy | 73/382 R |
| 5,275,048 | 1/1994 | Hulsing, II et al. | |
| 5,313,835 | 5/1994 | Dunn | 73/504.04 |
| 5,326,726 | 7/1994 | Tsang et al. | |
| 5,337,605 | 8/1994 | Schultz | 73/335.02 |
| 5,444,639 | 8/1995 | White | 73/510 |

FOREIGN PATENT DOCUMENTS

| | | | |
|---|---|---|---|
| 63-118667 | 5/1988 | Japan | 73/510 |
| 2151022 | 7/1985 | United Kingdom . | |
| 2242026 | 9/1991 | United Kingdom . | |

*Primary Examiner*—Christine K. Oda
*Attorney, Agent, or Firm*—Pollock, Vande Sande & Amernick

[57] ABSTRACT

An inertial sensor assembly has three silicon chips that are each machined to form a respective vibrating inertial sensor, an acceleration sensor and engaging edge formations. The three chips are assembled in an orthogonal arrangement by engaging the edge formations with one another.

14 Claims, 7 Drawing Sheets

INERTIAL SENSORS

This application is a continuation-in-part file wrapper continuation of U.S. patent application Ser. No. 08/610,147, filed Feb. 29, 1996, now abandoned.

BACKGROUND OF THE INVENTION

This invention relates to inertial sensor assemblies.

It is known to micro-machine solid-state inertial sensing devices from monolithic blanks of material such as silicon. Such sensing devices may take the form of oscillating 'tuning-forks' demonstrating detectable resonance when subjected to rotational accelerations (a form of solid-state rate gyro) or 'spatula' cantilevered masses demonstrating detectable displacements when subjected to translation accelerations (a form of solid-state accelerometer). The material blanks into which such devices are micro-machined are also known to be treated to incorporate the integral analogue and/or digital electrical driving, sensing, processing and signalling devices necessary to render such blanks, on completion, active solid-state inertial sensing devices or 'chips'.

These previous devices are micro-machined from essentially two-dimensional planar material blanks so that their resultant tuning forks and spatulas lie in the plane of the material. Since the resultant tuning-fork rate gyro senses rotation about its axis of symmetry, and since the resultant spatula accelerometer senses acceleration normal to its plane of symmetry, an array of such devices micro-machined from a planar blank of material is typically incapable of sensing rotations about more than two axes, or accelerations in more than one.

To sense rotations about three orthogonal axes, two such planar array devices are assembled into a three-dimensional form. To sense accelerations in three orthogonal axes three devices are similarly assembled. If inertial effects are to be measured precisely, the assemblies must be accurately orthogonal in alignment. Since planar array devices are small, it is difficult and costly to make and maintain accurate orthogonal alignment during assembly.

Inertial sensor assemblies are often used in aircraft and missiles, which are subject to high acceleration forces and vibration. It is important that any assembly including planar array devices be assembled in such a way that the accuracy of alignment is maintained during use despite these acceleration and vibration forces. Because the inertial sensor assemblies provide output signals to the navigational and flight control systems of the aircraft or missile, failure of the assembly during a high-force maneuver could have adverse consequences.

BRIEF SUMMARY OF THE INVENTION

It is an object of the present invention to provide an improved inertial sensor assembly and method of manufacture.

According to one aspect of the present invention there is provided an inertial sensor assembly comprising first and second planar members supporting respective inertial sensors, the planar members being formed with surface formations arranged to engage one another and retain the planar members in an angular relationship with one another.

The planar members are preferably assembled in an orthogonal arrangement. The surface formations may be located towards an edge of the planar members and may be provided by alternate projections and recesses along an edge of the planar member. The surface formations in at least one planar member may be provided by at least one opening in the planar member.

The assembly preferably includes three planar members assembled orthogonally with one another by engagement of the surface formations. The sensors are preferably solid-state vibrating inertial sensors and each planar member may include two inertial sensors arranged at right angles to one another. The sensors may include an acceleration sensor. The sensors are preferably machined from the material of the planar members. The planar members may also support associated electronics for the sensors. The planar members may be electrically interconnected with one another at locations adjacent a line of intersection of the planar members.

According to another aspect of the present invention there is provided a method of manufacture of an inertial sensor assembly comprising the steps of forming surface formations in first and second planar members supporting respective inertial sensors, and engaging surface formations of one planar member with surface formations of the other planar member such that the planar members are supported in an angular relationship with one another.

The method may include the step of forming the inertial sensors from the material of the planar members by the same technique used to form the surface formations.

According to a further aspect of the present invention there is provided an assembly made by a method according to the above other aspect of the present invention.

An inertial sensing assembly in accordance with the invention will now be described, by way of example, with reference to the accompanying drawings.

BRIEF DESCRIPTION OF THE DRAWINGS

FIG. 5b is a perspective view of a plinth carrier chip suitable for mounting the assembly shown in FIG. 5a;

FIG. 9b is a scrap perspective view of the completed joint between the two sensor chips shown in FIG. 9a;

FIG. 10b is a scrap perspective view of the completed joint between two of the sensor chips shown in FIG. 10a;

FIG. 11b is a scrap perspective view of an electrical interconnect component suitable for joining the interlocked sensor chips shown in FIG. 11a.

DETAILED DESCRIPTION OF THE PREFERRED EMBODIMENTS

Figure 1:
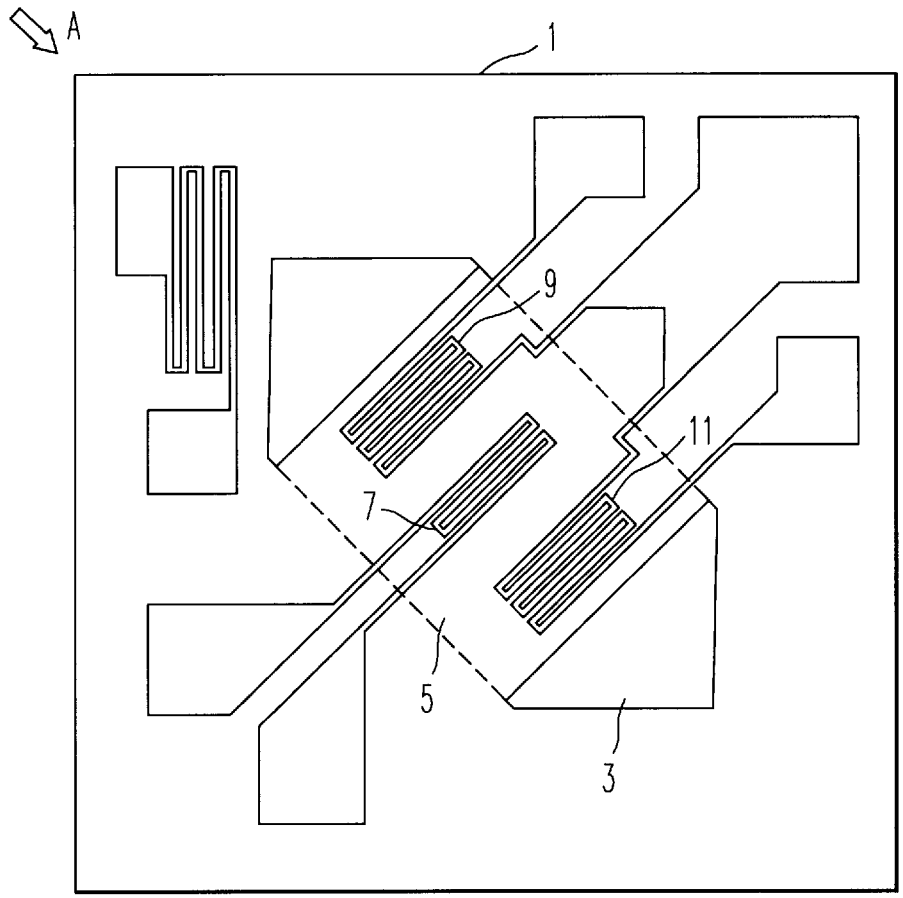
FIG. 1 is a plan view of a sensor chip with edge-lap joining forms.

With reference first to FIG. 1, there is shown a planar silicon chip 1 incorporating in its central area an integrally micro-machined tuning-fork rotational rate sensor 2. The sensor 2 is sensitive to rotational accelerations about an axis X parallel to the arms of the tuning-fork and lying in the plane of vibration. The sensor 2 is subject to excitation drivers 3 and resonance sensors 4 connected by electrical tracks 5 to an integral processing device 6, which in turn is connected to electrical connector pads 7 at the edge of the chip. The edge of the chip has been micro-machined by the same technique or process employed in forming the tuning-fork 2 to excise edge-lap joining forms 8 during the same operation. The forms 8 are a series of rectangular projections and recesses along the edges of the chip 1.

Figure 2:
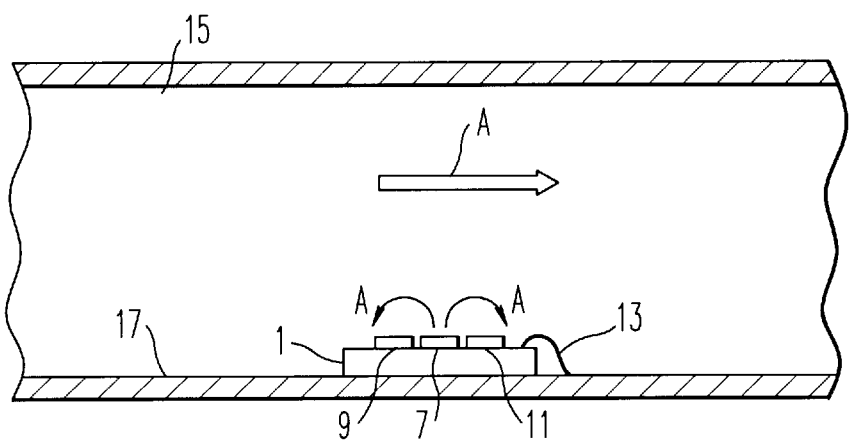
FIG. 2 is a plan view of a chip with several sensors and alternative mortise and tenon joining formations.
Figure 7:
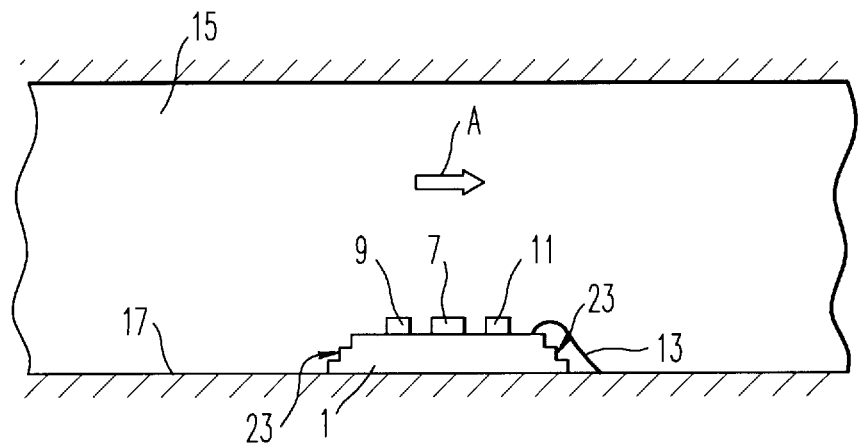
FIG. 7 is a sectional view of an electrical connection between two sensor chips.

Referring now to FIG. 2, there is shown an alternative configuration of planar silicon chip 1' incorporating an array of inertial sensors comprising two integrally micro-machined tuning-fork rotation sensors 2' arranged at right angles to detect rotational accelerations about axes X and Y respectively. The chip 1' also includes an integrally micro-machined spatula linear acceleration sensor 9 for detecting translation accelerations in the direction of an axis Z (not shown) perpendicular to the plane of the sensor. Adjacent to its edge, the chip 1' has been micromachined by the same process used in forming the tuning forks 2' and spatula 9 to excise within its body mortise holes 10, and on its edges corresponding protruding tenon tongues 11, each with electrical connector pads 7 (FIG. 7).

Figure 3:
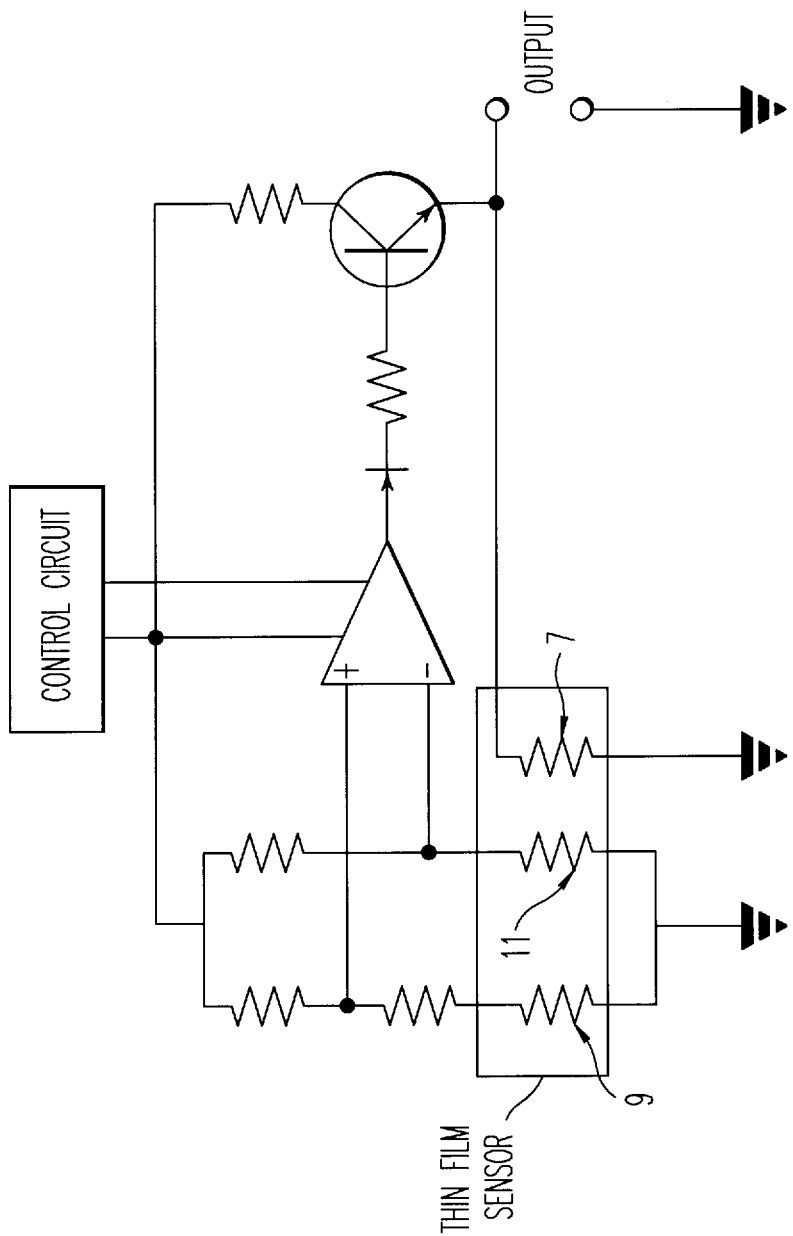
FIG. 3 is a perspective view of an assembly of three of the sensor chips shown in FIG. 1.

FIG. 3 shows an assembly of three identical ones of the planar silicon chips 1 shown in FIG. 1, illustrating the interlocking of each chip's edge-lap joining forms 8 to create a three-dimensional sensing device able to sense rotations about orthogonal axes X Y and Z.

Figure 4:
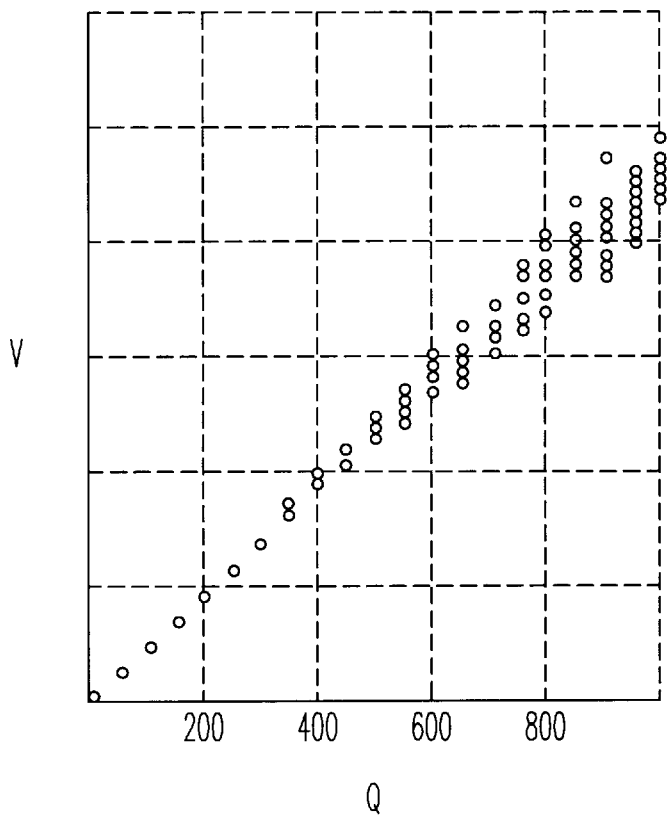
FIG. 4 is an exploded perspective view of an assembly of three of the sensor chips shown in FIG. 2.
Figure 5:
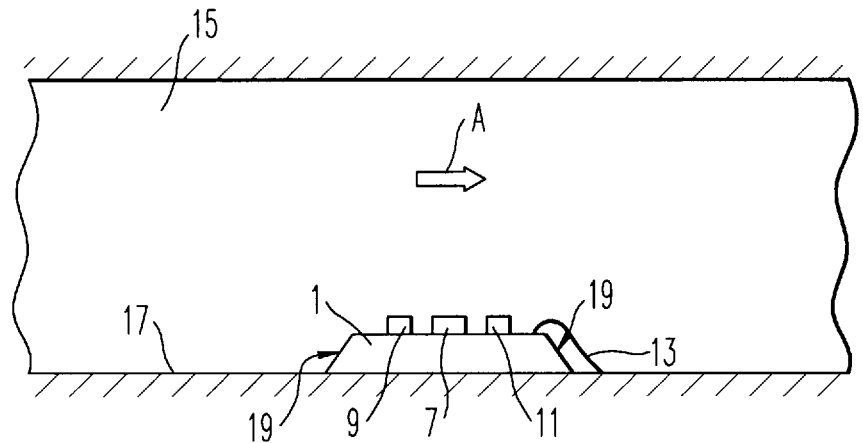

In FIG. 4 there is shown an alternative implementation of the invention showing three of the planar-array silicon chips 1' of FIG. 2, prior to assembly. After assembly, their mortise and tenon joining forms 10 and 11 interlock to create a three-dimensional sensing device capable of providing dual sensing of rotational accelerations in each of the three axes X, Y and Z by differently aligned tuning-fork sensors 2'. The assembly can also provide a single sensing of translation accelerations in each of the same three axes X, Y and Z by spatula sensors 9. It will be appreciated that further sensors could be made integral with each chip, co-aligned or differently oriented, to increase further the multiplicity and/or redundancy of the assembly's sensing capabilities in each axis.

Figure 5A:
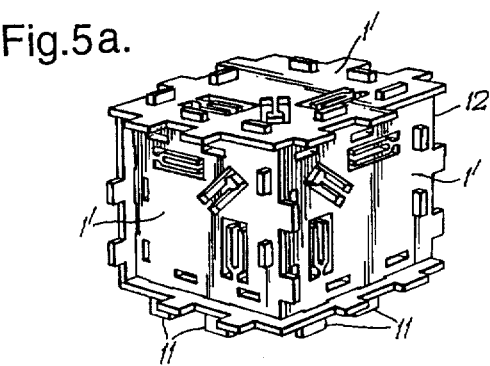
FIG. 5a is a perspective view of an assembly of six of the sensor chips shown in FIG. 2.
Figure 5B:
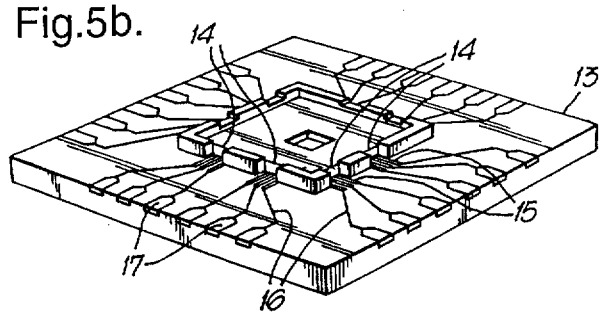
Figure 5C:
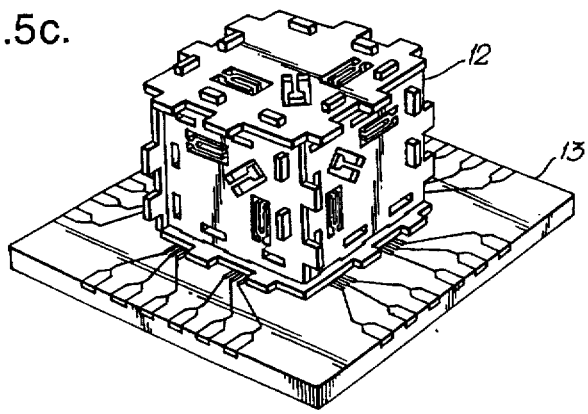
FIG. 5c is a perspective view of the assembly shown in FIG. 5a mounted on the carrier chip shown in FIG. 5b.
Figure 4:
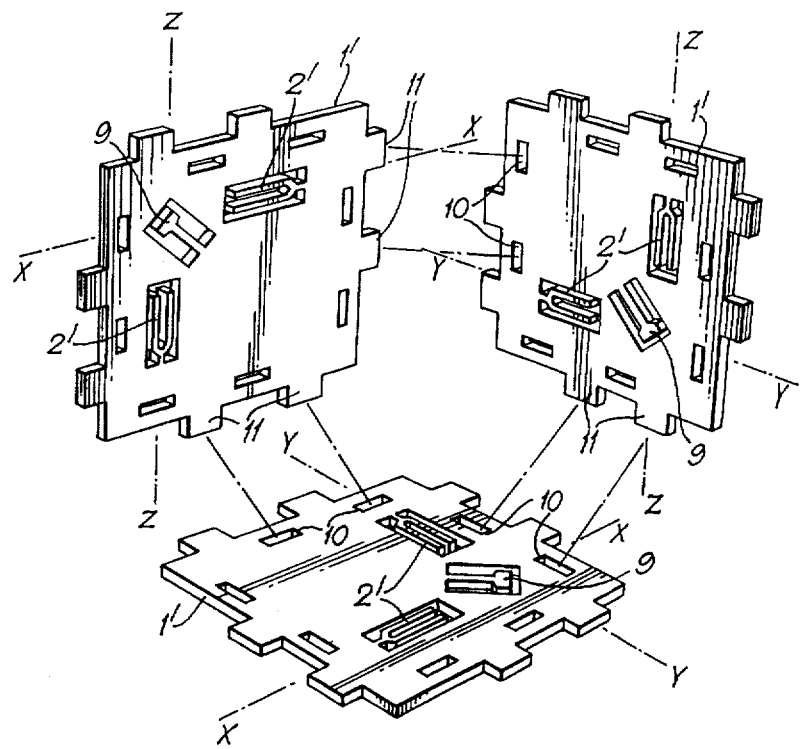
Figure 1:
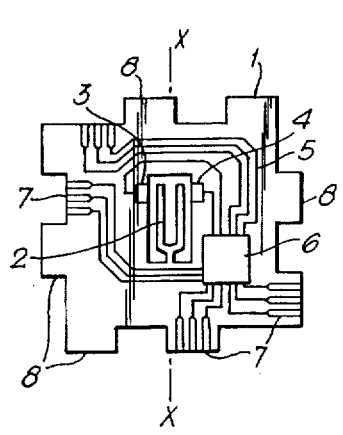
Figure 2:
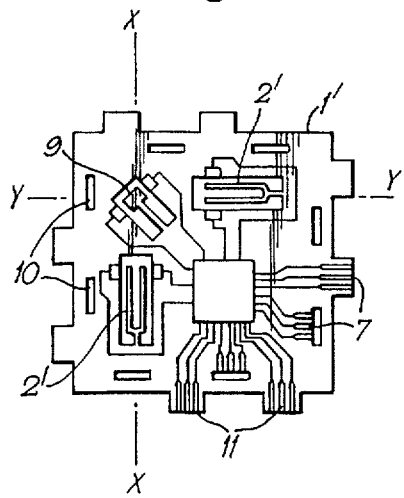
Figure 3:
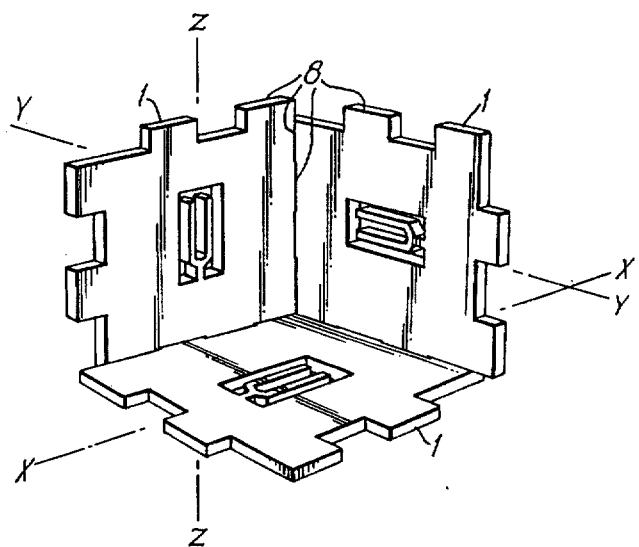

FIG. 5a shows a closed assembly 12 of six of the silicon chips 1' shown in FIG. 2 providing quadruplex rotational sensing, and duplex translation sensing, in all three axes. A plinth carrier chip 13 suitable for mounting the assembly 12 is shown in FIG. 5b; this has recesses 14 to accommodate the tenon tongues 11 of the assembly 12, as shown in FIG. 5c. The carrier chip 13 has connector pads 15 aligned to accept electrical connections with the assembly 12, and tracks 16 and terminal pads 17 configured to connect the, completed assembly electrically to other electrical devices (not shown).

Figure 6:
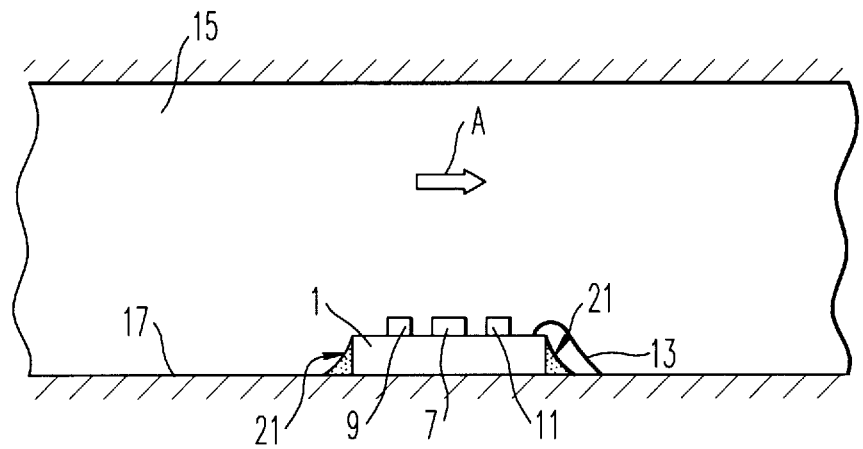
FIG. 6 is a scrap perspective view of the joint between two of the sensor chips shown in FIG. 1.
Figure 8:
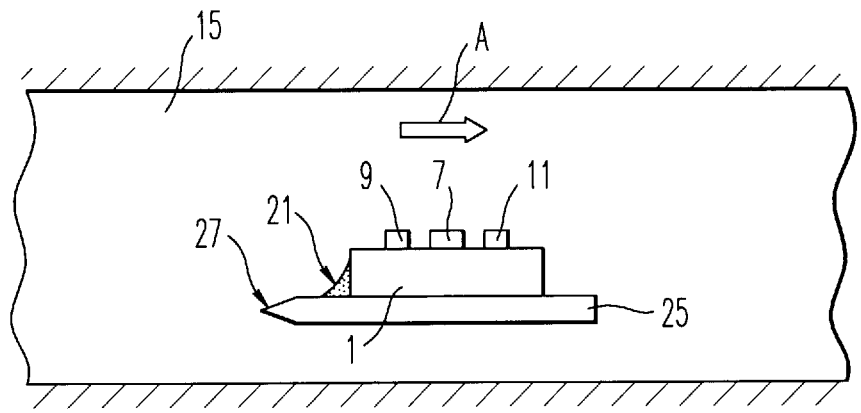
FIG. 8 is a sectional view of an alternative electrical connection between two sensor chips.
Figure 9:
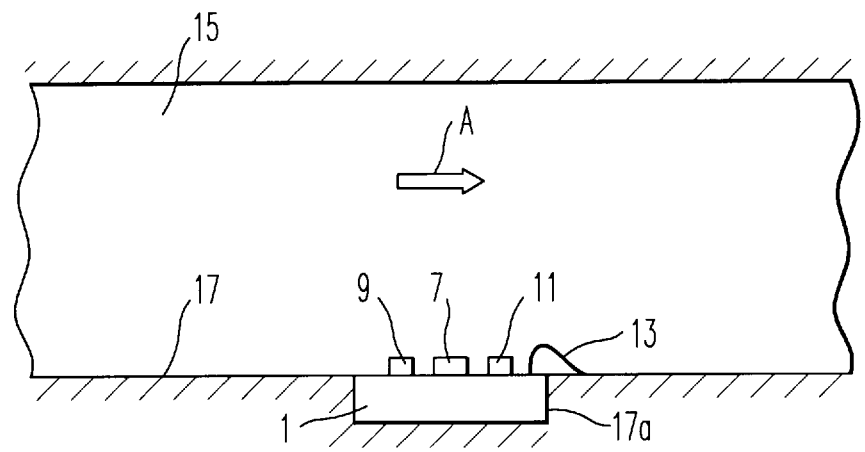
Figure 11:
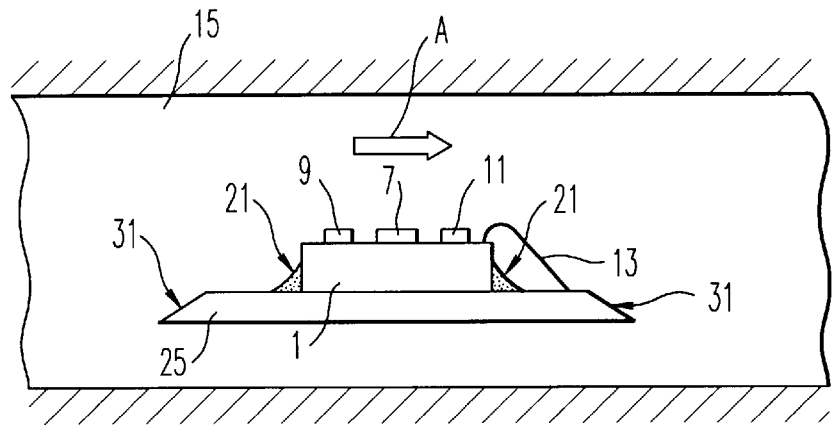
Figure 12:
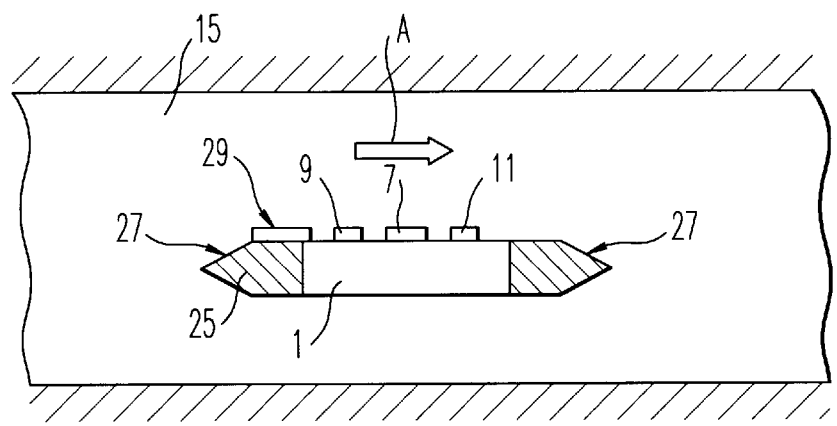
Figure 13:
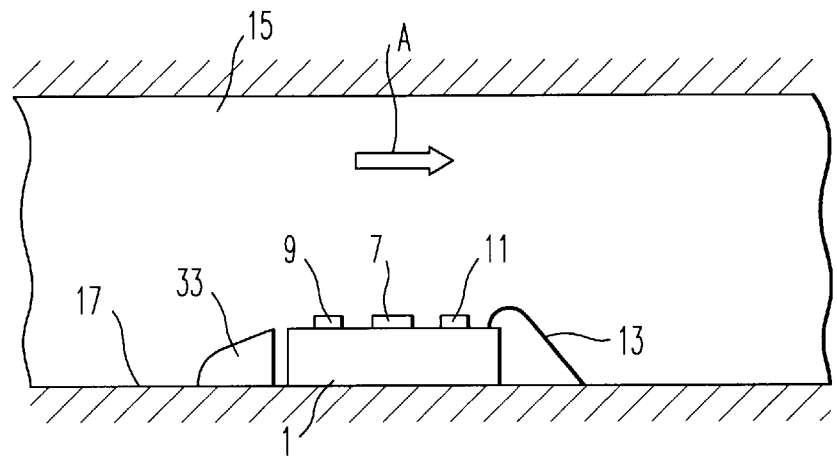
Figure 14:
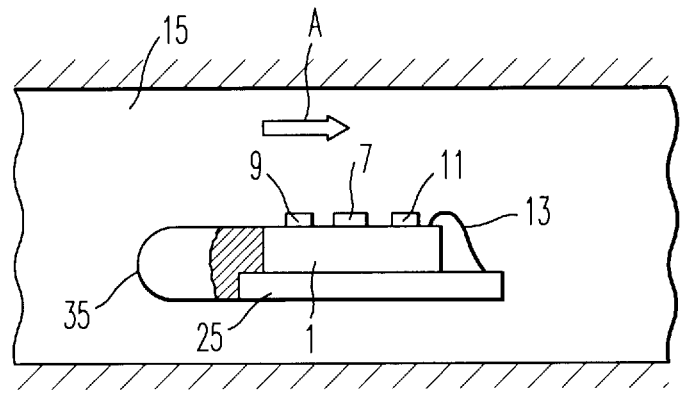
Figure 15:
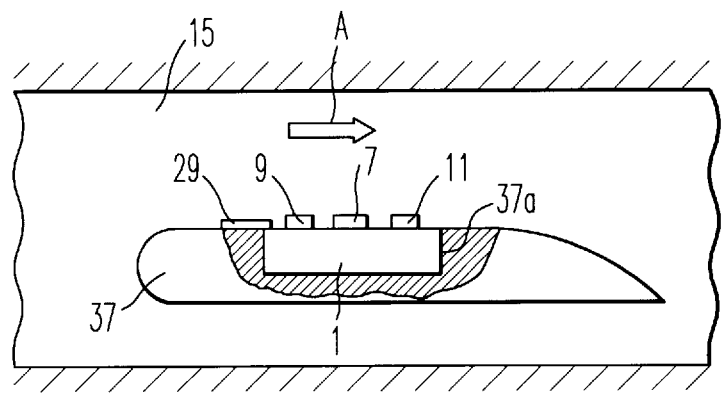
Figure 16:
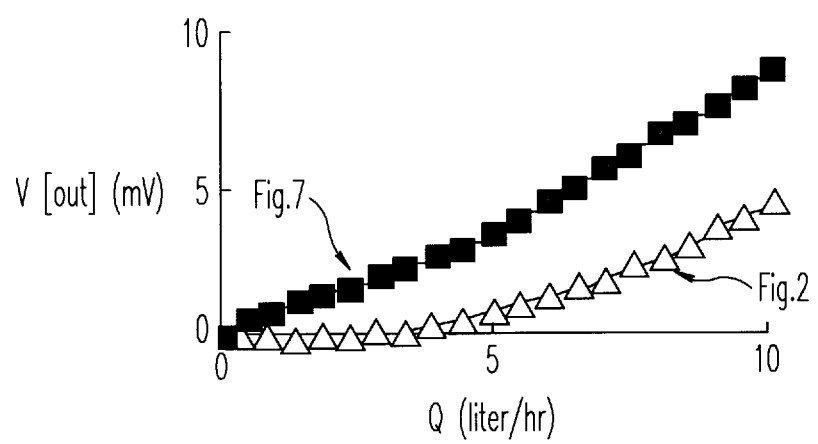

FIG. 6 shows the mated joining forms of two of the silicon chips 1 shown in FIG. 1 illustrating the close proximity of the electrical connection pads 7 in the joining forms 8 of each chip 1. The pads 7 on the two chips could be electrically connected by a solder plug 18, as shown in FIG. 7, or by wire bonding 19, as shown in FIG. 8.

Figure 9A:
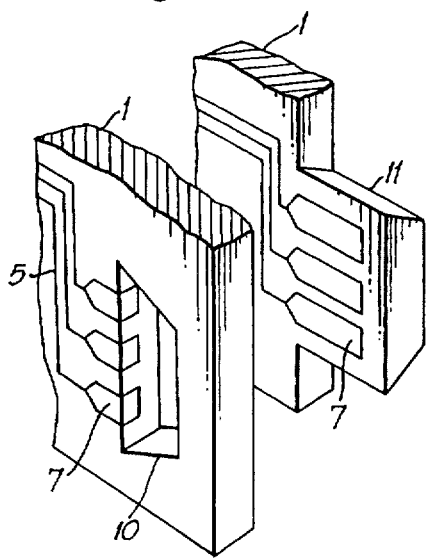
FIG. 9a is a pre-assembly scrap perspective view of the joining form of two of the sensor chips shown in FIG. 2.
Figure 9B:
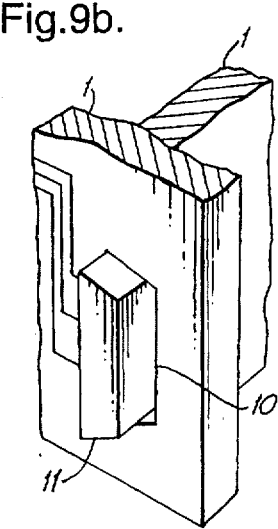

FIG. 9a shows the corresponding mortise 10 and tenon 11 surface formations on two of the sensor chips 1' illustrated in FIG. 2. Electrical connector pads 7 in the surfaces of the mortise and tenon joining forms are arranged to contact one another upon mating of the two chips. The geometry of the mortise 10 and tenon 11 are of wedge form so that, when assembled as shown in FIG. 9b, residual interference-fit stress pressure will maintain contact between the respective electrical connector pads 7.

Figure 10:
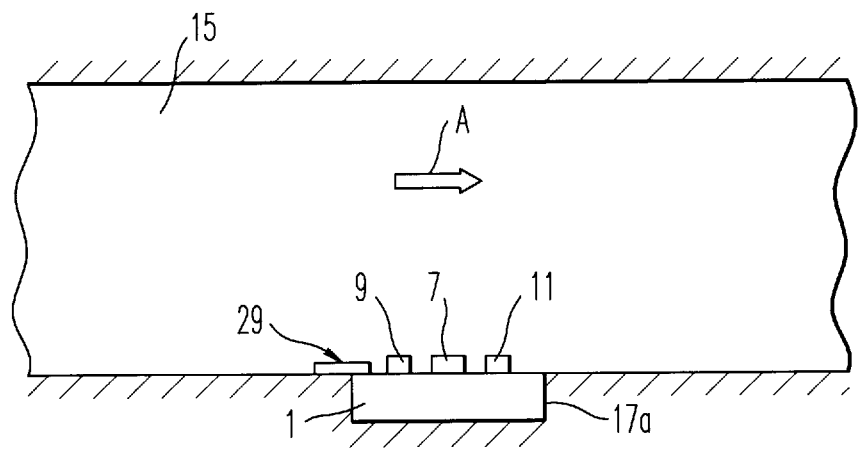
Figure 10A:
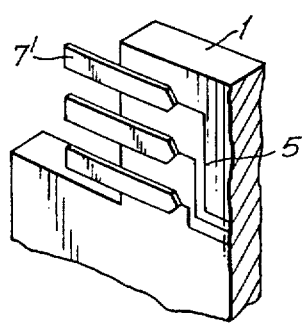
FIG. 10a is a scrap perspective view of an alternative arrangement of joining form with electrical connectors of the sensor chip shown in FIG. 1 before assembly.

In FIG. 10a there is shown an edge-lap joining form of the silicon chip 1 shown in FIG. 1 illustrating electrically-conductive tangs 7' sacrificially exposed by the photo-etch material removal process used in generating the edge-lap joining forms.

Figure 10B:
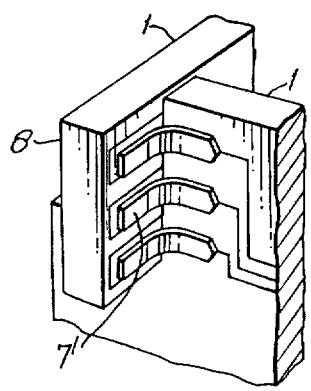

When the two chips 1 are assembled with one another, the tangs 7' on one chip are distorted and contact the pads 7 on an edge-lap joining formation of the other chip, as shown in FIG. 10b, so that the chips are electrically connected.

Figure 11A:
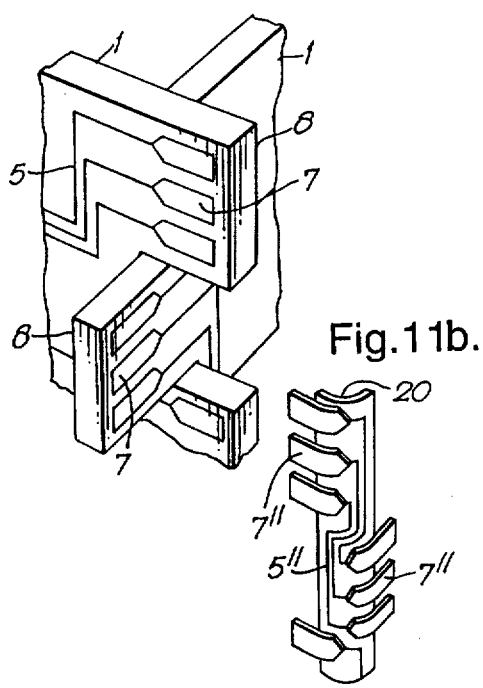
FIG. 11a is a scrap perspective view of two interlocked sensor chips of the type shown in FIG. 1.
Figure 11B:
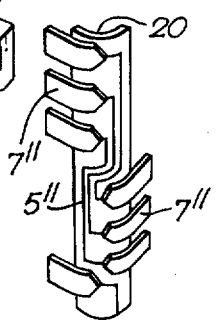
Figure 11C:
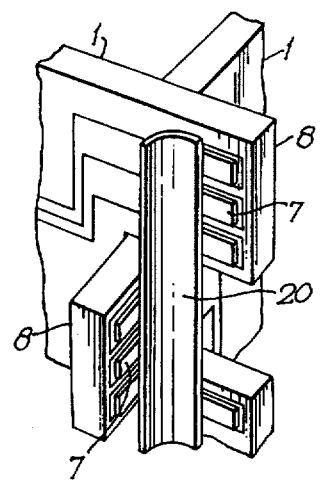
FIG. 11c is a scrap perspective view of the completed joint between the two interlocked sensor chips shown in FIG. 11a, electrically connected by the interconnect component shown in FIG. 11b.
Figure 6:
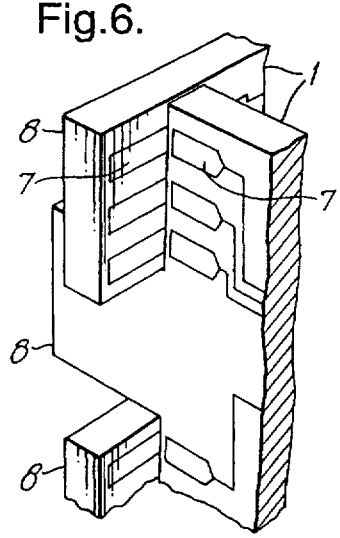
Figure 7:
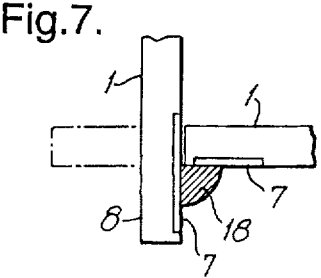
Figure 8:
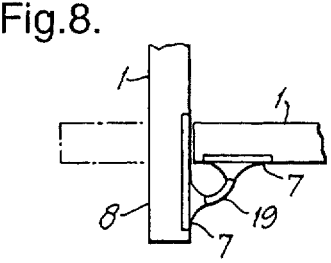

FIG. 11a shows the assembled interlocking edge-lap joining forms 8 of two of the mating silicon chips 1 shown in FIG. 1, illustrating an alternative arrangement of externally-arrayed electrically conductive pads 7 and tracks 5. The pads 7 are interconnected by an additional electrical assembly component 20 comprising a non-conductive carrier material with electrically-conductive tangs 7' selectively interconnected by tracks 5'. The tangs 7' project at right angles and are located to contact the pads 7 on the chips 1, as shown in FIG. 11c, so that electrical connection is established between the circuits on the two chips.

Other forms of interconnection could be used. It is not essential for the planar chips to be assembled in an orthogonal arrangement. If desired, they could be assembled at other angles to one another. Although it is preferable for the inertial sensors to be formed from the material of the planar members themselves, it would be possible for them to be formed separately and subsequently attached to mounting boards formed with interengaging surface formations.

The rigidity and/or structural integrity of the assemblies depends on the geometry of the joining forms and the nature of the electrical connections. The assemblies can have a high rigidity and integrity, and can maintain accurate alignment of the chips even under conditions of adverse acceleration and vibration, because of the direct mechanical engagement of the surface formations of the chips with one another. Conventional bonding or potting techniques can be used to improve the rigidity of the structure.

The geometries of the sensors in the planar devices can be varied either during or after forming and prior to assembly so as to avoid vibrational resonance or other undesirable cross coupling affects between sensors.

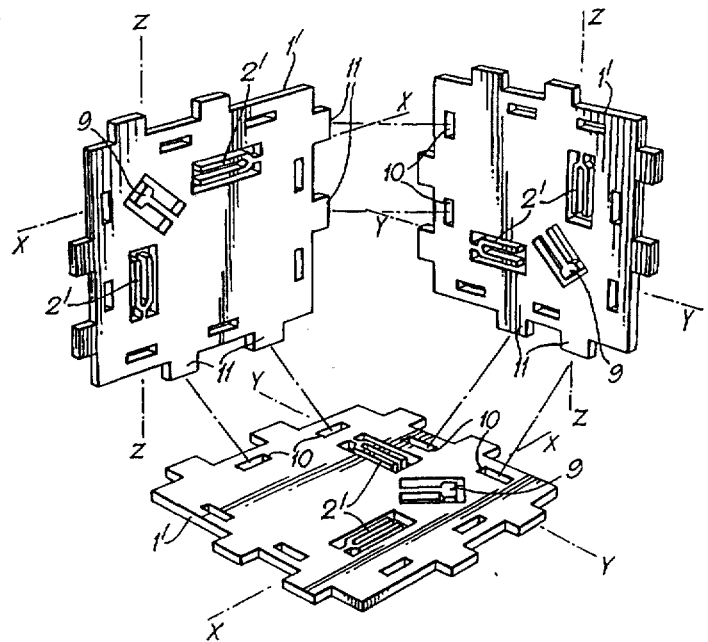

What I claim is:

1. An inertial sensor assembly comprising: first and second planar members; and first and second inertial sensors formed from said planar members, said planar members having surface formations along edges of said members formed from material of said members, wherein said surface formations on different ones of said planar members engage one another, and wherein said surface formations mechanically support and retain said planar members in an angular relationship with one another.

2. An assembly according to claim 1, wherein said planar members are assembled in an orthogonal arrangement.

3. An assembly according to claim 1, wherein said surface formations are provided by alternate projections and recesses along said edges of said planar members.

4. An assembly according to claim 1, wherein a surface formation in at least one of said planar members is provided by at least one opening in said planar member.

5. An assembly according to claim 1 including three of said planar members assembled orthogonally with one another by engagement of said surface formations.

6. An assembly according to claim 1, wherein said sensors are solid-state vibrating inertial sensors.

7. An assembly according to claim 6, wherein each said planar member includes two inertial sensors arranged at right angles to one another.

8. An assembly according to claim 1, wherein said sensors include an acceleration sensor.

9. An assembly according to claim 1, including associated electronics for said sensors, and wherein said planar members support said associated electronics for said sensors.

10. An assembly according to claim 1, wherein said planar members intersect one another along a line, and wherein said assembly includes electrical interconnections between said planar members at locations adjacent said line of intersection.

11. An inertial sensor assembly comprising: three planar members; three solid state vibrating inertial sensors machined from respective ones of said planar members, said planar members having surface formations along edges of said members formed from material of said members, wherein said surface formations on different ones of said planar members engage one another, and wherein said surface formations mechanically support and retain said planar members in an orthogonal relationship with one another.

12. An inertial sensor according to claim 11, wherein each said planar member includes two vibrating inertial sensors arranged at right angles to one another, and an acceleration sensor.

13. A method of manufacture of an inertial sensor assembly comprising the steps of:

providing first and second planar members;

forming a first inertial sensor from a portion of the material of said first planar member;

forming a second inertial sensor from a portion of the material of said second planar member;

forming surface formations in said planar members from the material of said members; and positioning said first and second inertial sensors in a desired relation to one another by engaging surface formations of said first planar member with surface formations of said second planar member such that said planar members are supported and retained in an angular relationship with one another by said engaging surface formations.

14. A method according to claim 13, wherein said inertial sensors are formed from the material of said planar members by the same technique used to form said surface formations.

* * * * *

UNITED STATES PATENT AND TRADEMARK OFFICE
CERTIFICATE OF CORRECTION

PATENT NO.  : 5,880,368
DATED       : March 9, 1999
INVENTOR(S) : FitzPatrick

It is certified that error appears in the above-identified patent and that said Letters Patent is hereby corrected as shown below:

Title page, showing the illustrative figure, should be deleted and substitute therefor the attached title page.

In the Drawing, the drawing sheets consisting of Figs. 1-16, should be deleted to be replaced with the Drawing Sheets, Consisting of Figs. 1-11b, as shown on the attached pages.

Signed and Sealed this

Fifth Day of October, 1999

*Attest:*

Q. TODD DICKINSON

*Attesting Officer*     Acting Commissioner of Patents and Trademarks

United States Patent [19]
FitzPatrick

[11] Patent Number: 5,880,368
[45] Date of Patent: Mar. 9, 1999

[54] INERTIAL SENSORS

[75] Inventor: Roger Sean FitzPatrick, Cheltenham, England

[73] Assignee: Smiths Industries Public Limited Company, London, England

[21] Appl. No.: 859,264

[22] Filed: May 20, 1997

Related U.S. Application Data

[63] Continuation-in-part of Ser. No. 610,147, Feb. 29, 1996, abandoned.

[30] Foreign Application Priority Data

Apr. 19, 1995 [GB] United Kingdom ............ 9507930

[51] Int. Cl.$^6$ ............................................. G01P 1/00
[52] U.S. Cl. ............................................. 73/493; 73/510
[58] Field of Search ...................... 73/493, 494, 495, 73/383, 504.03, 504.04, 862.043, 431, 510, 511, 512, 382 G, 382 R, 178 R, 504.12, 335.02

[56] References Cited

U.S. PATENT DOCUMENTS

| | | | |
|---|---|---|---|
| 4,179,818 | 12/1979 | Craig | 73/178 R |
| 4,212,443 | 7/1980 | Duncan | 73/504.03 |
| 4,703,394 | 10/1987 | Petit | 361/413 |
| 4,744,248 | 5/1988 | Stewart | 73/504.04 |
| 4,891,984 | 1/1990 | Fujii et al. | |
| 5,012,316 | 4/1991 | Silvermint | |
| 5,038,613 | 8/1991 | Takenaka | 73/493 |
| 5,101,669 | 4/1992 | Holm-Kennedy | 73/382 R |
| 5,275,048 | 1/1994 | Hulsing, II et al. | |
| 5,313,835 | 5/1994 | Dunn | 73/504.04 |
| 5,326,726 | 7/1994 | Tsang et al. | |
| 5,337,605 | 8/1994 | Schultz | 73/335.02 |
| 5,444,639 | 8/1995 | White | 73/510 |

FOREIGN PATENT DOCUMENTS

| | | | |
|---|---|---|---|
| 63-118667 | 5/1988 | Japan | 73/510 |
| 2151022 | 7/1985 | United Kingdom. | |
| 2242026 | 9/1991 | United Kingdom. | |

*Primary Examiner*—Christine K. Oda
*Attorney, Agent, or Firm*—Pollock, Vande Sande & Amernick

[57]  ABSTRACT

An inertial sensor assembly has three silicon chips that are each machined to form a respective vibrating inertial sensor, an acceleration sensor and engaging edge formations. The three chips are assembled in an orthogonal arrangement by engaging the edge formations with one another.

14 Claims, 5 Drawing Sheets